(12) United States Patent
Guindi et al.

(10) Patent No.: US 6,356,204 B1
(45) Date of Patent: Mar. 12, 2002

(54) METHOD AND APPARATUS FOR DETECTING IMPENDING EARTHQUAKES

(75) Inventors: Sami Guindi, St. Lambert; Robert Heidt, Kirkland; Afshin Sadri, Toronto, all of (CA)

(73) Assignee: Tectonics Research Group, Inc., Quebec (CA)

( * ) Notice: Subject to any disclaimer, the term of this patent is extended or adjusted under 35 U.S.C. 154(b) by 0 days.

(21) Appl. No.: 09/463,987
(22) PCT Filed: Jun. 1, 1998
(86) PCT No.: PCT/CA98/00531
  § 371 Date: Feb. 17, 2000
  § 102(e) Date: Feb. 17, 2000
(87) PCT Pub. No.: WO99/09433
  PCT Pub. Date: Feb. 25, 1999

Related U.S. Application Data
(60) Provisional application No. 60/056,363, filed on Aug. 19, 1997.

(51) Int. Cl.$^7$ ................................................ G08B 21/00
(52) U.S. Cl. ..................... 340/690; 340/683; 340/669; 340/665; 340/689; 73/659; 73/649; 73/658
(58) Field of Search ..................... 340/690, 683, 340/601, 669, 665, 566, 686.1, 689, 526; 73/587, 659, 769, 649, 658; 702/34

(56) References Cited

U.S. PATENT DOCUMENTS

| | | | |
|---|---|---|---|
| 3,186,237 A | 6/1965 | Forrest | 73/514.34 |
| 3,506,957 A | 4/1970 | Davison | 367/36 |
| 3,984,803 A | 10/1976 | Hawk et al. | 367/2 |
| 4,066,992 A | 1/1978 | Buller et al. | 367/36 |
| 4,271,407 A | 6/1981 | Kehrman et al. | 340/690 |
| 4,300,135 A | 11/1981 | Korn et al. | 340/690 |
| 4,300,220 A | 11/1981 | Goff et al. | 367/188 |
| 4,408,196 A | 10/1983 | Freeman | 340/690 |
| 4,473,768 A | 9/1984 | Kerr et al. | 310/329 |
| 4,480,480 A | * 11/1984 | Scott et al. | 73/769 |
| 4,616,320 A | 10/1986 | Kerr et al. | 702/14 |
| 4,649,524 A | 3/1987 | Vance | 367/13 |
| 4,689,997 A | 9/1987 | Windisch | 73/652 |
| 4,764,762 A | 8/1988 | Almour | 367/178 |
| 4,849,947 A | 7/1989 | Baule et al. | 367/178 |
| 5,001,466 A | 3/1991 | Orlinsky et al. | 340/690 |
| 5,387,869 A | 2/1995 | Enomoto | 324/348 |
| 5,396,223 A | 3/1995 | Iwabuchi et al. | 340/640 |
| 5,526,694 A | * 6/1996 | McEachern et al. | 73/587 |
| 5,539,387 A | 7/1996 | Gitlis et al. | 340/690 |
| 5,625,348 A | 4/1997 | Farnsworth et al. | 340/690 |
| 5,760,696 A | 6/1998 | Sadri et al. | 340/690 |
| 5,842,148 A | * 11/1998 | Prendergast et al. | 702/34 |

* cited by examiner

*Primary Examiner*—Benjamin C. Lee
(74) *Attorney, Agent, or Firm*—Oppenheimer Wolff & Donnelly LLP; Claude A. S. Hamrick (57) ABSTRACT

An apparatus and associated method for detecting impending earthquakes includes at least one sensor, and preferably multiple sensors, for mounting on a building or other like structure, and include a transducer for converting vibration signals to electronic impulses. The signals are transmitted to a solid state detection circuit, which distinguishes between extraneous signals and signals indicative of the P-waves which signal an impending earthquake. Discrimination between relevant and non-relevant may be achieved by selecting a minimum amplitude and duration of signals within a selected frequency range, and triggering an alarm when the selected minimums are exceeded. Where multiple sensors are deployed, temporal overlap between selected signals can be assessed for further discrimination.

30 Claims, 7 Drawing Sheets

METHOD AND APPARATUS FOR DETECTING IMPENDING EARTHQUAKES

This application is 371 of PCT/CA98/00531 filed Jun. 1, 1998 which claims benefit of U.S. provisional application No. 60/056,363 filed Aug. 19, 1997.

FIELD OF THE INVENTION

The present invention is directed to detection of impending earthquakes and more particularly, the invention relates to a detector and method for discriminating between general earth tremors and tremors which are precursors to an earthquake. Further, the invention relates to a relay-type earthquake detector for relaying a warning signal to remotely located sensors.

BACKGROUND OF THE INVENTION

It is well documented that earthquakes have characteristic wave forms and vibration characteristics which are particularly useful for identifying earthquake caliber vibrations from simple random vibrations which are typically encountered in earth formations. Typically, an earthquake tremor results in the propagation of P-(primus) waves, which are propagated as compression and rarefaction and as well involves S-waves (secundus), which waves propagate an orthogonal angle to the direction of the wave. Generally speaking, the P-waves have a natural frequency of approximately 5 Hertz(Hz) while S-waves have a frequency significantly less than the P-waves. The S-waves have a significantly larger amplitude than the P-waves and therefore are the waves that are principally involved in the destruction to structures. P-waves typically travel at a faster rate from an epicenter to a given locale in comparison with S-waves. Thus, detection of P-waves can serve as a warning of the arrival of S-waves at a given location, in particular a location at some remove from the epicenter.

One of the primary difficulties in earthquake detection relates to the time factor involved in detecting tile P-waves. As will be realized, if P-waves can be detected as early as possible, this provides time for evacuation etc., of a building or area in order to avoid potential human injury caused by the arrival of S-waves which, as indicated above, are the chief destructive waves transmitted by geological formations. Early detection of P-waves has conventionally been difficult.

The art has previously proposed various detectors and other arrangements to measure P-waves to portend S-waves. However, in existing arrangements, one of the primary difficulties is providing sensitivity sufficient to detect P-waves at a distance from the epicenter of an earthquake without incurring large costs. A further difficulty has been encountered in that there is often difficulty resolving false alarms from a real earthquake, due to interference in the instrumentation by extraneous vibrations or other frequencies. It is desirable to provide a detector capable of discriminating between P-waves and ordinary, everyday ground and building tremors unrelated to an earthquake. In particular, detectors mounted to a building should be capable of discriminating between the natural vibration frequencies of the building structure, which are a function of the structure, and frequencies indicative of P-waves. The same may be accomplished by means of an information processing unit that stores vibration data and is programmed to discriminate between frequently occurring frequencies and non-regularly occurring frequencies within the range of P-waves.

Typical of the art that has been patented in this field is U.S. Pat. No. 4,689,997, (Windisch). The reference provides a detector which primarily employs a vertical spring barb mounted on a support. A coupler is supported on the other end of the barb and this coupler is connected through a coil spring to a mass positioned in concentricity with the barb and coupler. The spring and mass components are selected to have a natural resonant frequency corresponding to that of an earthquake tremor or other vibration to be detected. A switching circuit is provided to detonate an alarm once the earthquake frequency is detected. Windisch does not provide an integrated circuit mechanism for detection of earth tremors, but rather relies on a mechanical arrangement in the form of a spring and mass system. As is known, such systems are susceptible to temperature fluctuations which can alter the point at which the apparatus can detect the earthquake frequency. Further, the Windisch arrangement does not appear to provide a system which discriminates between simple extraneous vibration and earthquake caliber frequencies.

Caillat et al., in U.S. Pat. No. 5,101,195, provide a discriminating earthquake detector. The arrangement relies on an electromechanical arrangement having a cantilevered device with a predetermined mass on one end. During movement of the beam, an electrical signal is generated which, in turn, is useful for detection of P- and S-waves. Similar to the above-mentioned detectors in the prior art, the arrangement provided in this reference would appear to have limited utility in that there is no provision for a comparison between earthquake caliber waves and those which are simply extraneous, such as would be encountered in traffic vibration, mechanical vibration in a building, aircraft vibration, etc.

U.S. Pat. No. 5,001,466, issued Mar. 19, 1991 to Orlinsky et al., provides an earthquake detector employing an electrically conductive liquid switch means among other variations thereof.

In view of what has been previously proposed in the art, it is clear that there exists a need for a more sophisticated earthquake detector which is discriminatory between extraneous vibration and earthquake level vibration which is not limited in sensitivity.

A further need is for a detector having the ability to communicate both with other like detectors or servers, in order to improve detection capabilities, and remote locations for coordination of earthquake information.

Accuracy of a detector may also be enhanced by having regard to various P-wave characteristics. For example, it has been found that P-waves are indicative of serious earthquakes if they have a duration greater than a certain value. For most locations, this value is approximately 15 milliseconds, although in some locations this is less. Further, it has been found that earthquakes may be predicted with reasonable accuracy if multiple spaced-apart sensors detect P-waves over tile temporal threshold with temporal overlap existing between the detected P-waves.

SUMMARY OF THE INVENTION

One object of the present invention is to provide an improved earthquake detector capable of detecting earth tremors at a selected frequency and verifying whether the same are indicative of an imminent earthquake. A further object is to provide a detector system comprising a central processor in communication with multiple spaced apart sensors to further enhance advance warning of an earthquake.

Another object of the present invention is to provide an improved discriminatory earthquake detector for discrimination against natural structural vibrations.

Another object of the present invention is to provide a method of detecting vibration signals indicative of an earthquake, comprising the steps of:

providing a vibration detecting means for detecting vibration signals in a structure responsive to ground vibration, the detection means comprising an integrated circuit including a potentiometer circuit;

mounting the detecting means to the structure;

determining the natural vibration frequencies of the structure;

intermittently comparing electronically any extraneous vibration signal different from the vibration signal of the structure; and determining whether the extraneous signal is within a predetermined earthquake signal level indicative of P-waves.

The step of determining whether the signal is indicative of P-waves may include measuring electronically the amplitude and duration of the vibration signals and determining whether these exceed predetermined minimum levels.

A further object of the present invention is to provide a method for detecting an earthquake, comprising the steps of: providing an earthquake detector having a first sensor for sensing a selected frequency indicative of an earthquake and a transducer means for transmitting and receiving information and an alarm;

providing a second sensor independent of the first for at least receiving information from the first sensor, the second sensor for verifying information received from the first sensor;

subjecting the first and second sensors to the selected frequency;

transmitting information indicative of the detected frequency from the first server to the second sensor;

processing the information by the sensors; and activating the alarm means when the frequency is indicative of an earthquake.

Alternatively, the first and second server may independently transmit the vibration detection information to an independent control unit.

In a further aspect, the method comprises the steps of:

providing first and second sensors remotely positioned from each other for sensing a selected vibration frequency indicative of an impending earthquake;

providing communication means for communication between the first and second sensors;

providing a processing unit in communication with the first and second sensors for selecting earth tremor information received from the sensors in the form of a voltage having an amplitude;

subjecting the sensors to the selected frequency and communicating the information indicative of the vibration between the sensors;

selecting within the processing unit a voltage peak indicative of vibrations having an amplitude and duration exceeding selected minimum levels;

assessing any temporal overlap between the selected voltage peaks associated with each of the sensors, activating alarm means when the amplitude, temporal duration and temporal overlap of the voltage peaks associated with the sensors is indicative of an impending earthquake. Communication between the sensor means and processing unit may be affected by means of wireless or wired electronic communication means, including wireless communication in the infrared or radio frequencies.

Optionally, the processing unit may be remotely positioned from the first and second sensors, and itself incorporate a third sensor.

Conveniently, information from the processing unit can be downloaded to a computer programmed to process the information and optionally transmit the information to corresponding earthquake detectors.

Optionally, the sensors and processing unit can communicate by means of light-emitting diodes (LED's), or at radio, microwave or IR frequencies.

A further object of the present invention is to provide an integrated circuit electronic detector for detecting any vibration signals of a structure or structures positioned on a substrate, comprising:

detector means for detecting a predetermined vibration signal of the structure and an extraneous signal different from the vibration signal;

amplifier means for amplifying the signal;

comparator means for comparing an extraneous signal with the predetermined vibration signal of the structure to verify whether the extraneous signal is indicative of P-waves; and potentiometer signal adjustment means for adjusting the detector means to different vibration signals of a structure.

Selectively actuable alarm means may be connected to the comparator means, the alarm means capable of actuation when the extraneous signal is within the predetermined vibration signal.

In a further aspect, the comparator means includes a filter for limiting the detection to vibrations having an amplitude greater than a predetermined minimum and a timer for measuring the duration of said amplitude peaks. The alarm is triggered when the duration of an amplitude peak exceeds a selected amount. For many locations, this selected duration is about 15 milliseconds.

A further object of the present invention is to provide an apparatus for detecting earthquakes and relaying a signal generated therefrom to a remote location, comprising:

an earthquake detector having a first sensor for detecting a frequency indicative of an earthquake and an alarm means actuable at the frequency;

transducer means for relaying and receiving information from the first sensor;

second sensor means remote from the first sensor including a second transducer means for communicating at least with the first sensor; and a comparator means associated with the earthquake detector for comparing a transmitted signal received by the first sensor with the second sensor for confirmation of an earthquake signal.

The sensors may be linked by any known means for transmissions of electronic signals, including wire linkage and wireless linkage. The latter may include, for example, infrared and radio frequency transmission, for example in the 800–900 megahertz range.

In a further aspect, communication links are established between the units in at least two different frequencies.

In a further aspect, information from the sensors is processed in a logic device for recording vibration information in order to better discriminate against unimportant vibrations, and interfacing with the alarm means for providing an alarm in advance of an earthquake.

In a further aspect, a detector is provided for detecting precursor earthquake tremors, comprising:

first and second sensors for detecting vibrations at a frequency indicative of an impending earthquake;

communication means for transmitting and receiving information between the first and second sensor means;

a comparator means for comparing transmitted signals received by the first and second sensors for confirmation of an impending earthquake signal;

alarm means actuable at the said frequency.

In a further aspect, the apparatus includes a central controller for controlling the operation of the sensors. The controller may also incorporate information storage means for recording and storing vibration tremor information detected by the sensors. The controller may further include a communications port, such as an RS 232 port, permitting an interface of the controller with a computer, which may be programmed with software for storing and processing the earth tremor information.

The controller may be independent of the first and second sensors and may itself incorporate a third sensor.

The transducers within the sensors convert the vibration detected by the sensor into a voltage value, which in turn is transmitted to the controller. A voltage peak above a preselected level is indicative of P-waves affecting the sensor.

The controller preferably includes voltage peak comparison means, for comparing the duration of a voltage peak above a selected limit, indicating a precursor earthquake tremor detected by both (or all three) sensor means, and for assessing any temporal overlap in the voltage peak. The controller further includes filter means whereby voltage peaks having an amplitude above a selected amount are compared for temporal overlap, and voltage peaks having an amplitude below the selected amount are not so subjected. The controller further conveniently includes adjustment means to permit the user to adjust the selected duration cutoff to reflect local earthquake conditions.

Having thus described the invention, reference will now be made to the accompanying drawings illustrating the preferred embodiments.

BRIEF DESCRIPTION OF THE DRAWINGS

Similar numerals in the figures denote similar elements.

DETAILED DESCRIPTION OF THE DRAWINGS

Figure 1:
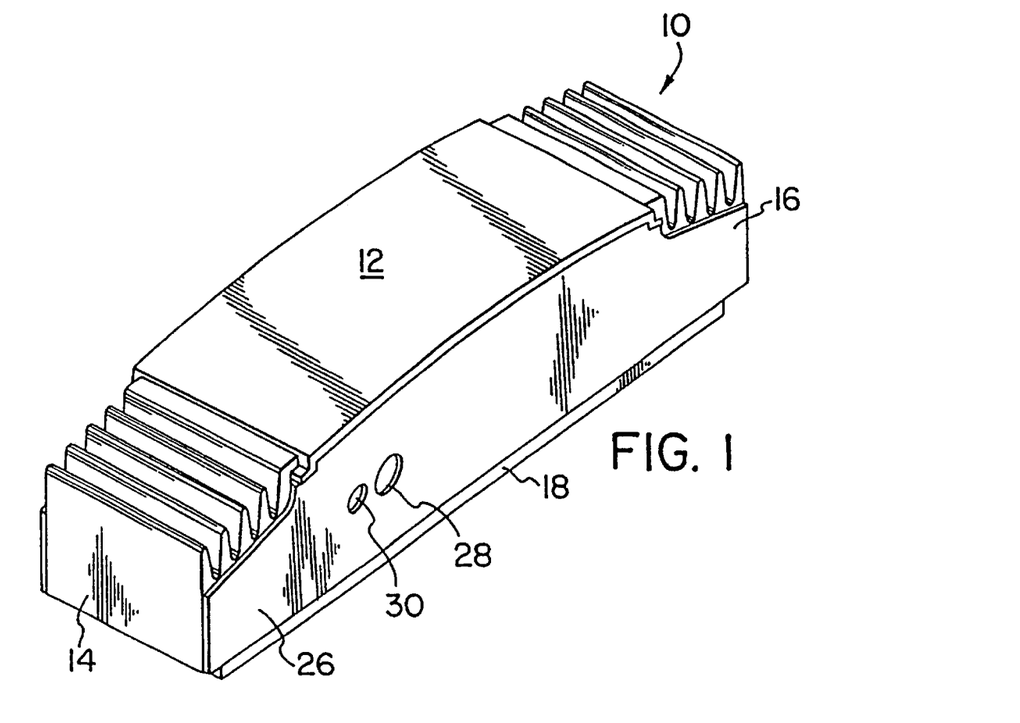
FIG. 1 is a perspective view of the apparatus according to one embodiment.
Figure 3A:
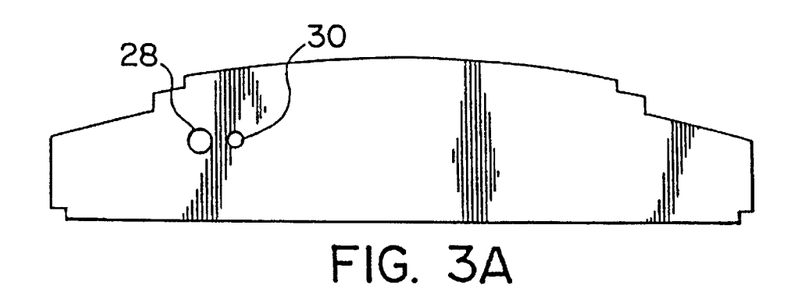
FIG. 3a is a top plan view of the top mounting plate of the apparatus.
Figure 3B:
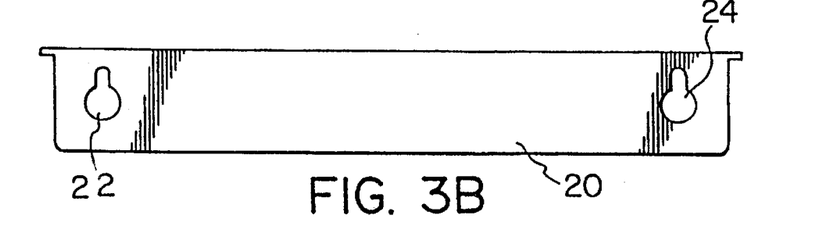
FIG. 3b is a bottom plan view of the mounting bracket.

Referring now to the drawings, FIG. 1 is one possible embodiment of the discrete earthquake alarm, broadly denoted by numeral 10. The apparatus includes a front face 12 with opposed ends 14 and 16 and a rear face 18. A top mounting plate 20, shown in plan view in FIG. 3b, is provided with two spaced apart eyelets 22 and 24 for mounting the apparatus 10 to a substrate such as a building etc. (not shown). A bottom plate 26 is provided with two apertures 28 and 30. Aperture 28 receives a reset button (not shown) in order to reset the circuit discussed hereinafter. Aperture 30 receives a light emitting diode (LED) (not shown), the purpose of which will be discussed below.

Figure 2:
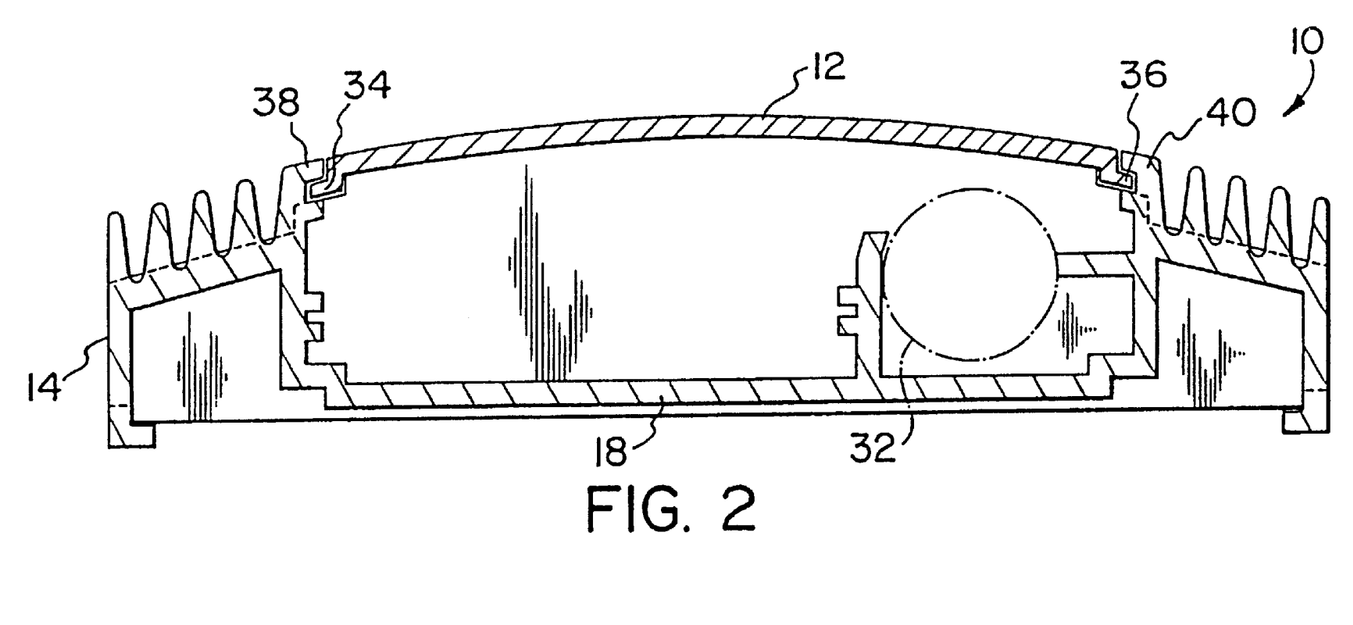
FIG. 2 is a longitudinal cross-section of the apparatus of FIG. 1.

FIG. 2 illustrates a longitudinal cross-section of the apparatus 10 in which a piezoelectric alarm element 32 is shown in chain line. Piezoelectric element 32 is designed to produce an audible signal once the apparatus in activated indicating an earthquake is imminent. Front face 12, as illustrated in FIG. 2, includes lips 34 and 36, which are received within cooperating recesses 39 and 40, respectively on the apparatus 10.

Figure 4:
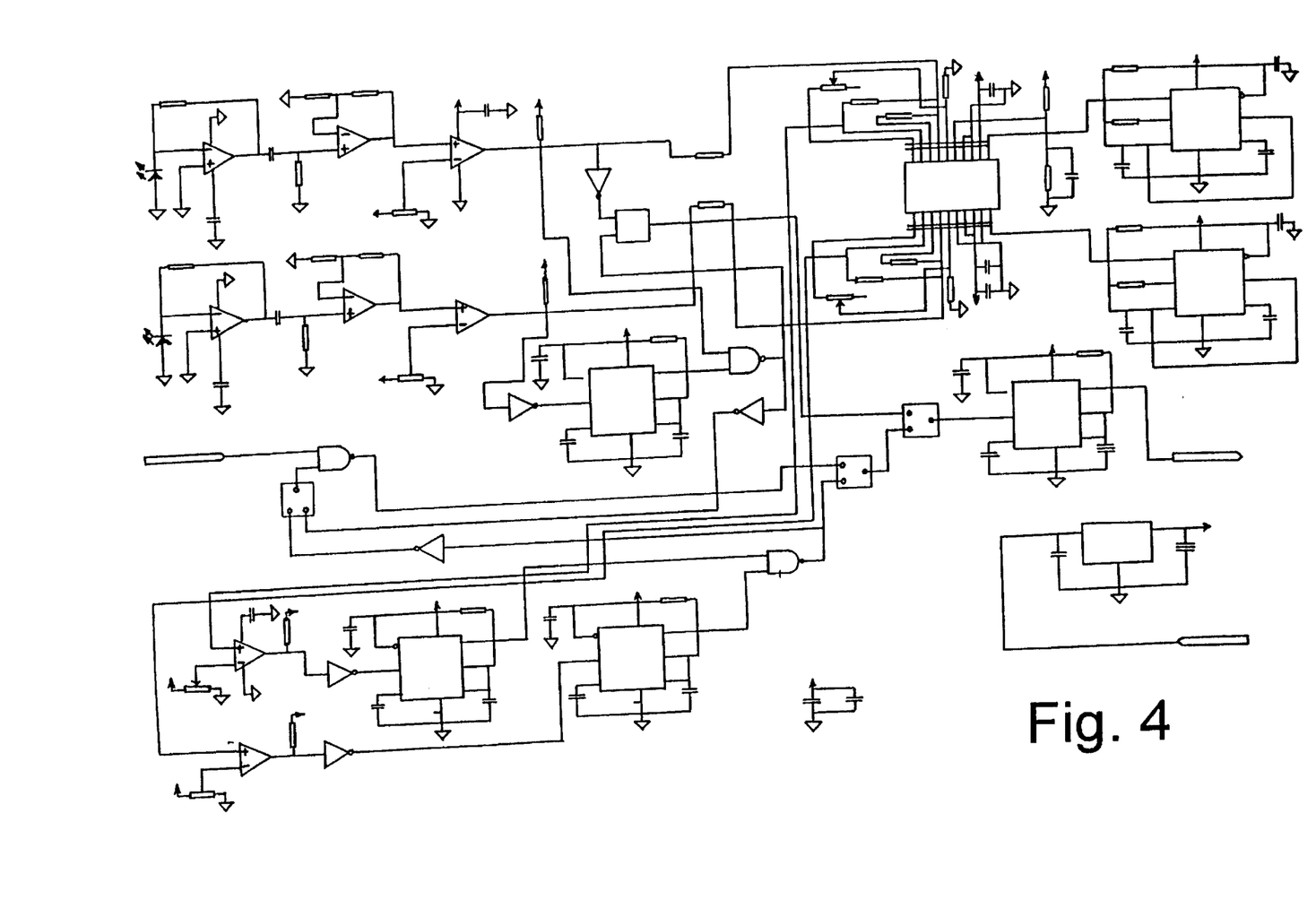
FIG. 4 is a schematic illustration of the electrical elements according to one embodiment of the present invention.

Referring now to FIG. 4, an example of the circuitry employed in the apparatus 10 is shown in schematic representation. The apparatus provides a transducer circuit, broadly denoted by numeral 42 for detecting incoming signals. The incoming signals are filtered by a potentiometer circuit 44 encompassing resistors R1, R2 and potentiometer P1. The potentiometer circuit 44 allows adjustment of a selected frequency or frequencies to be introduced into the remaining circuitry and representing the natural harmonics of the building. Once a signal has been selected, the same can be passed on to the amplification portion of the circuit, broadly embracing resistors R3, R4, R5 and UART chip 4 (U4 Voltage Source $V_{cc}$). The amplification circuit is broadly denoted by numeral 46. The amplified signal is passed on to a detector 48, the detector comprising a UART chip U1A. The detected signal is passed on to a logic circuit denoted by numeral 50 comprising a pair of linked UART chips U1B and U1C. The logic circuit compares the signal that is incoming with tile natural harmonic frequency signal of the building and comparison is made to determine whether the incoming signal is below the predetermined natural frequency of the building. If the signal does exceed this latter amount, the result is the detonation of the alarm to be discussed hereinafter. A manual reset circuit is provided by the combination of the UART chip U2A and diode D1A, the reset circuit being denoted by numeral 52. Also provided is an automatic reset circuit comprising diode D1B and UART chip U28 and resistor R7. The auto reset circuit is denoted by numeral 54. Automatic reset of the system will occur after two minutes of ringing of the alarm. This valve is variable. Numeral 56 represents a conventional clock circuit comprising a capacitor C2 and resistors R9, R10. The circuit is designed to provide two minutes of ringing of the alarm. Clock circuit 56 is connected to the main counter chip 58, which acts as the main distribution system for the circuit. The entire arrangement is connected to chip 58. Numeral 60 broadly denotes a conventional buzzer or alarm circuit composed of resistors R16, R17, capacitor C3, UART chips U2D and U2C an Piezoelectric circuit BZ1 as well as diode D7. The buzzer is modulated by diodes D3A and D3B and together these form the modulation circuit 62 connected to main counter chip 58.

The apparatus may be adapted to interface with an existing building system, which may be adapted to trigger the following responses among others:

audible alarm gas supply cut-off elevator interruption curtailing of fueling operations Numeral 64 represents an optional battery check circuit with low voltage detector lamps to indicate whether the system is operational. This is shown in chain line. The arrangement is provided with diodes D4A, D4B, D5A, D5B and D6 and resistors R13 through R14 as well as transistors Q1, Q2 and light emitting diodes 1/G and 1/R.

In alternate embodiments of the circuit, suitable integrated circuits which may be employed include MC14467PI, MC14468P, MC145010DW, all by Motorola, SD2 by Supertex and 5348 by Allegro Electronics. Other suitable examples will be appreciated by those skilled in the art.

In another embodiment, the clock circuit 56 associated with chip 58 may be removed as illustrated in chain line in FIG. 4.

With the present invention, it has been found that apparatus 10 can be mounted to any suitable point in the infrastructure of a building (not shown), for example a wall. This is useful with the present system since a comparison circuit is provided to determine whether an incoming signal is simply due to extraneous mechanical vibration such as that which would be encountered from aircraft, heavy traffic, internal vibration, etc. In this manner, once the natural frequency of the building is determined, this can be preset by the potentiometer circuit and therefore when an incoming signal is less than this frequency, the logic of the circuit, numeral 50 in FIG. 4, can then compare that incoming signal with the predetermined natural frequency of the structure to determine whether, in fact, the value is sufficient to actuate the alarm 60. In prior art devices, no such comparison circuit has been provided and further, the systems did not provide full electronic components, but rather relied upon electromechanical arrangements or straight forward mechanical arrangements, all of which are susceptible to temperature fluctuations, sensitivity limitations, etc. By incorporating all discrete electronic components in the apparatus of the present invention, no such limitations exist. This is particularly complemented by the fact that the circuit prevents false alarms and can, in fact, be set to "filter out" extraneous vibration to only result in passage of P-waves, the precursors of S-waves.

A particularly attractive advantage with the present arrangement is that the comparator logic circuit 50 is not continuously running for comparing ground vibration to P-wave vibration as is a chief limitation in the prior art arrangement. With the present invention, once a voltage reaches the threshold value between detector circuit 48 and logic circuit 50, then the arrangement is actuated. Accordingly, there is no continuous power drain with the current arrangement and this, of course, inherently leads to a more reliable and efficient circuit.

In a particularly preferred embodiment, the apparatus 10 may be combined with any known sensing means. The sensing means can be placed in any position within a room in order to confirm the signal between the apparatus 10 and any such sensing mechanism. In t his manner, the apparatus 10 and the second sensing mechanism can both confirm that the signal received by the apparatus 10 is, in fact, indicative of an imminent earthquake. Transmission between the second sensing mechanism and apparatus 10 may be achieved by any known method, i.e. infra-red transmission, microwave, etc. In order to facilitate a companion between the two signals, a comparison circuit may be employed. Such circuits are well known and set forth in the prior art. Once the signal has been compared, there can be a determination of the signal strength which may or may not be sufficient to trigger the alarm. Providing this arrangement, the advantage of preventing false alarms is greatly enhanced over arrangements in the prior art. The second sensing mechanism may include any number of existing sensors, including uni- or triaxial sensors, and will be understood that this explanation is not confined to only a single unit.

Figure 7:
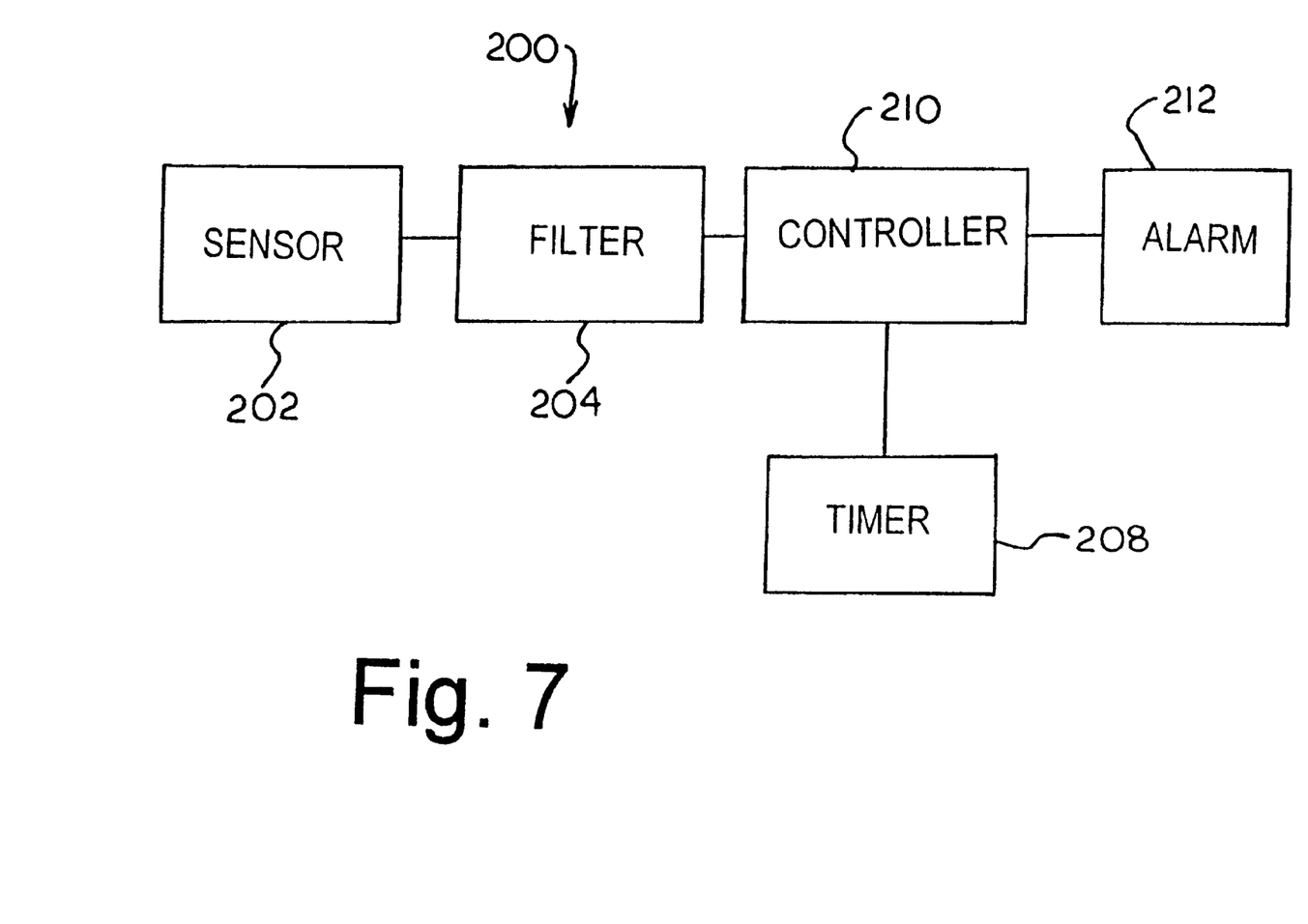
FIG. 7 is a block diagram illustrating a third embodiment of the invention.

A further embodiment is shown in FIG. 7. In this version, a stand-alone unit 200 comprises a sensor 202, a filter 204, timer 208, controller 210 and alarm 212. These elements are all connected within a housing, not shown. The filter permits the passage of signals detected by the sensor having a frequency indicative of P-waves. The timer 208 assesses the duration of the selected signals. The controller 210 assesses the voltage of the signal, indicative of the amplitude of the detected vibration, and triggers the alarm 212 when the duration and amplitude of a selected signal exceeds predetermined minimums. For most locations, the minimum duration of concern is about 15 milliseconds.

According to a further embodiment of the present invention, once the signal determination has been made and the P-wave frequency has been detected, this information may be relayed via a transmitter to remotely located sensors in other buildings or in other geographical areas. It will be appreciated by those skilled in the art that transmission of the signal may be achieved by any of the known methods currently employed for signal transmission, including telecommunications, Internet, etc.

Figure 5:
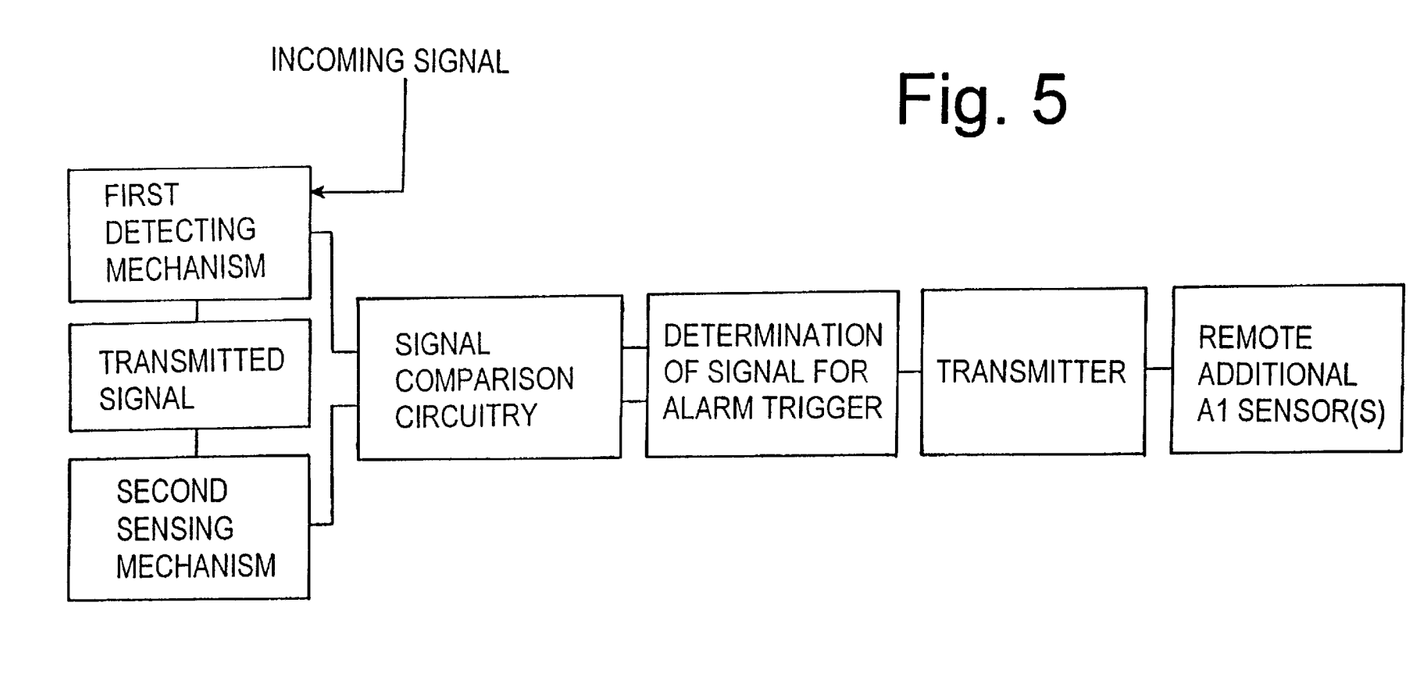
FIG. 5 is a block diagram showing the operation of an apparatus for detecting earthquake activity, according to one embodiment of the present invention.

FIG. 5 sets forth an overall flow chart scheme for providing signal verification and the remotely located relay or transmission of the signal.

Figure 6:
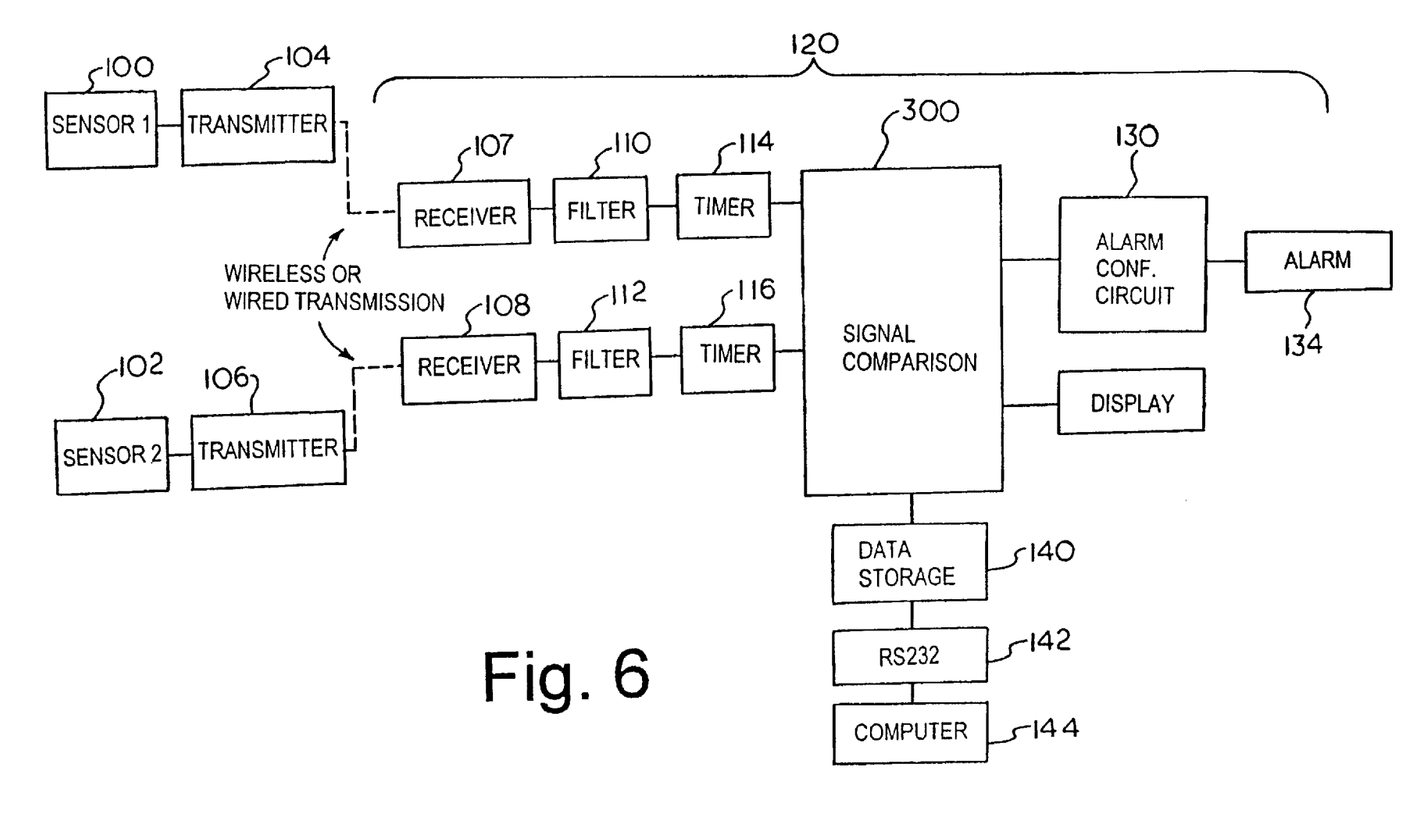
FIG. 6 is a block diagram showing the operation of an apparatus for detecting earthquake activity according to a further embodiment of the present invention.

A further embodiment of the invention is illustrated schematically in FIG. 6. Dual sensors 100 and 102 are provided, for mounting to a solid surface such as a building wall at separate locations removed from each other, for example on opposing sides of a building or within two separate buildings. Each sensor incorporates a transducer-type vibration detection means, for converting vibratory movement into an electronic signal, as described above. Sensors 100, 102 are associated with transmitters 104 and 106 for transmitting signals from the sensors via wired or wireless communications, including infrared, radio frequency or visible light frequency. Alternatively, the signals may be transmitted by wire, and the transmitters in this case comprise simply plug-ins for installation of a wire. The signals transmitted by tile transmitters are received by corresponding receivers 106 & 108, associated with a processing unit 120. The processing unit 120 may comprise a stand alone unit, or alternatively may be integrated with one of the sensors 100 or 102 and hardwired to the corresponding sensor. From each receiver 106 and 108, the electronic signals are transmitted through a corresponding band pass filter 110, 112. The two band pass filters are used on the receiver side in order to distinguish the two transmitters, based on (frequency modulated) carrier signals. A suitable band pass filter is model ML2110 from MicroLinear (TM). In one example, the first sensor/filter combination is tuned to 4.7 Kilohertz and the second sensor/filter combination is tuned to 2.9 kilohertz. Each band pass filter is associated with a corresponding timer circuit and clock unit 114, 116. The timer circuit and clock units perform two functions. First, they are adapted to filter out signals having a duration less than a preselected duration. For example, it has been found for most localities that tremors are indicative of an impending significant earthquake if they have an amplitude greater than a selected level (indicative of P-waves) with this amplitude peak having a duration of greater than approximately 15 milliseconds. If the amplitude peak is less than this, a significant earthquake is not indicated. It has been found that this duration may differ in different localities around the globe, depending on soil type and other factors. Accordingly, adjustment means are provided to change the cut off duration depending on the region where the device is installed. A further function of the timer circuit/clock unit is to correlate, and compare voltage peak information with similar information from corresponding units, as is discussed below.

The signal comparison circuit 118 receives signals from the timer circuit/clock units 114 and 116. The signal comparison circuit performs the function of assessing any temporal overlap in signals received from the respective timer circuit/clock units and as well contains a potentiometer circuit for comparing the frequency of the incoming signal with the natural predetermined frequency of the building as discussed above. Further, the signal comparison circuit assesses the amplitude of the voltage peak of the incoming frequencies, indicative of the amplitude of the detected vibration signal.

The alarm confirmation logic circuit 130 receives from the signal comparison circuit 118 information regarding the voltage peak amplitude, duration and duration of any temporal overlap between signals received from the two sensors, and compares this information with a preselected alarm level. In the event that the amplitude and duration of a signal peak and duration of overlap between signals received from the two sensors exceeds the preselected level, the alarm 134 is triggered.

A data storage unit 140, which may be remote from the signal comparison unit 118 or associated therewith, receives data from the signal comparison unit 118 for storage and later viewing by the user. Data from the data storage unit 140 may be downloaded to a computer by way of an RS232 port or any other suitable computer connection means. Computer 144 can further process the data, and in particular can compare historical data relating to tremors, with any data relating to a tremor received at a given time by the apparatus. This information permits the user to further adjust the apparatus to respond to local condition and prevent false alarms. Further, tile computer 144 may be linked to other similar apparatuses in remote locations via telecommunication means.

A further feature of the present invention resides in the capability of employing the sensors as described above in any location, without the requirement of a separate transducer for response to local conditions. For this purpose, the filters 110 and 112 and the various logic circuits are adjustable, whereby the cut off frequency above which vibration signals are not processed may be changed by the user along with the prescribed frequency duration preselected by the user.

Figure 8:
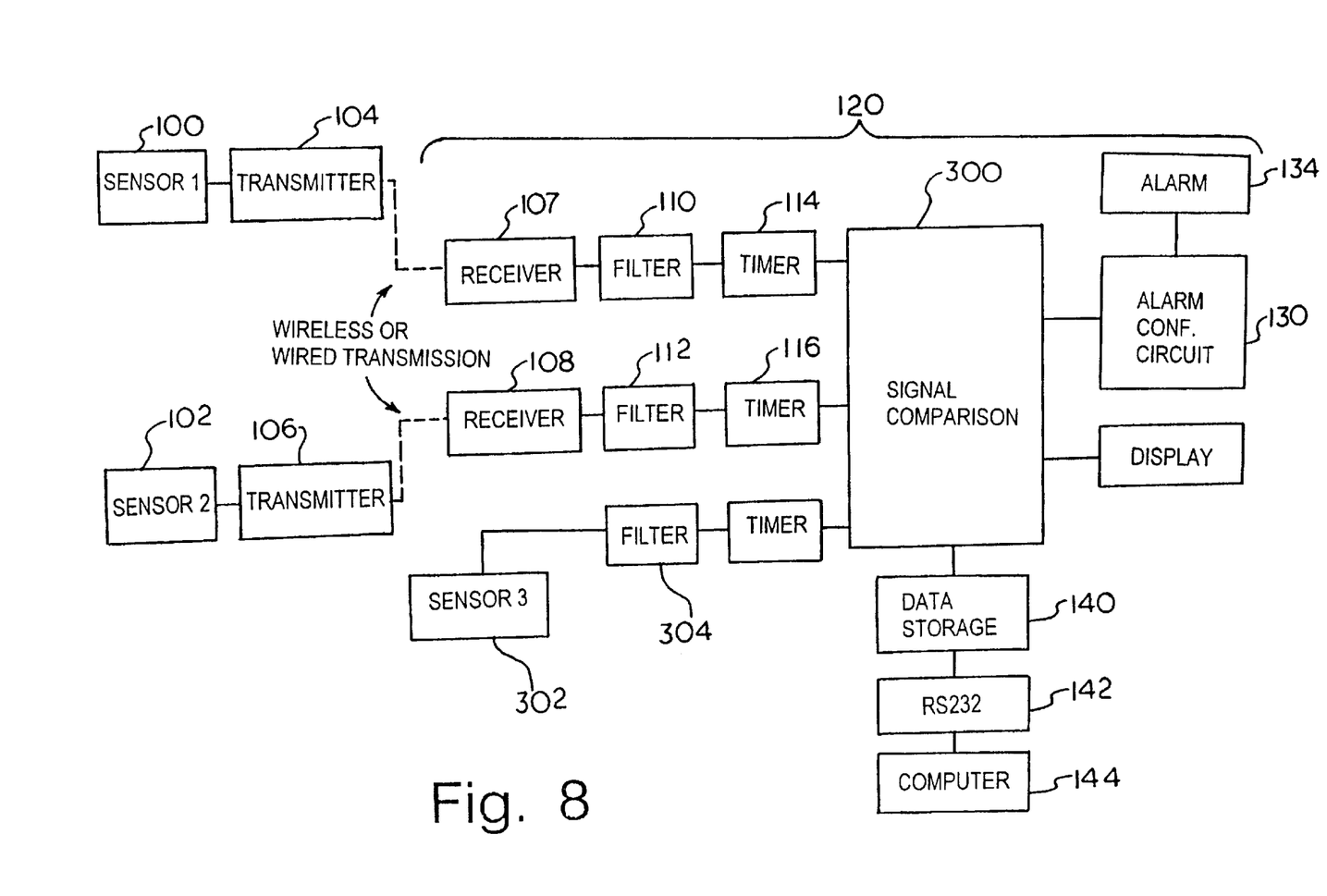
FIG. 8 is a block diagram illustrating a fourth embodiment of the invention.

FIG. 8 illustrates a variation of this apparatus, wherein the master control unit 300 incorporates a third sensor 302, linked directly to a third filter 304. This version provides enhanced sensitivity.

The multiple sensors may be mounted in separate buildings or other structures, and individually hard-wired to the controller. The remote positioning of the sensors in this manner enhances the sensitivity of the detector.

Although embodiments of the invention have been described above, it is not limited thereto and it will be apparent to those skilled in the art to which this intention pertains that numerous modifications and departures form part of the present invention in so far as they do not depart from the spirit, nature and scope of the claimed and described invention.

What is claimed is:

1. A method for detecting vibration signals from a stationary object or objects, said signals being indicative of an impending earthquake, characterized by the steps of:

providing first and second sensors for detecting vibration within a structure responsive to vibration of a fixed substrate upon which the sensor is mounted, said sensors each featuring an electronic detection circuit to convert said vibration to electronic signals, and a transmitter to transmit said electronic signals via transmission means;

providing a processing unit having receiving means for receiving electronic signals transmitted by said sensors, a timer circuit for measuring the duration of the signals received from said sensors, and a logic circuit including a potentiometer circuit;

mounting said first and second sensors to said fixed structure;

determining the natural vibration frequencies of said structure;

presetting said potentiometer circuit to said vibration frequencies of said structure;

comparing electronically with said logic circuit any extraneous vibration signal different from said preset vibration frequencies of said structure and allowing passage of electronic signals indicative of P-waves acting on said structure;

measuring with said timer circuit the duration and temporal overlap of said signals indicative of P-waves from each of said sensors;

determining whether said duration and temporal overlap of said extraneous signals exceed predetermined levels indicative of an impending earthquake; and activating alarm means when said duration and temporal overlap indicate an impending earthquake.

2. A method as in claim 1 wherein said electronic signals are transmitted from said sensors to said processing unit by means of infrared signal transmission means.

3. A method as in claim 1 wherein said electronic signals are transmitted from said sensors to said processing unit by means of radio frequency transmission means.

4. A method as in claim 1 wherein said electronic signals are transmitted from said sensors to said processing unit by means of microwave transmission means.

5. A method as in claim 1 wherein said electronic signals are transmitted from said sensors to said processing unit by means of visible light transmission means.

6. A method as in claim 1 characterized by the further step of processing said signals within said processing unit with first and second band pass filters associated with respective sensors, to permit transmission signals from said respective sensors to be separately processed within said processing unit.

7. A method as in claim 1 wherein electronic signals from said processing unit are downloaded to a computer for further information processing.

8. A method as in claim 1, comprising the further step of determining the amplitude of said signals with said sensors, and activating said alarm means when said amplitude exceeds a selected level for said selected duration.

9. A method as in claim 1, comprising the further step of providing a third sensor associated with said processing unit.

10. A method as defined in claim 1, wherein said alarm means comprises an audible alarm.

11. A method as defined in claim 1, comprising the further step of actuating a gas supply cutoff means upon detecting earthquake vibration signal.

12. A method as defined in claim 1, comprising the further step of actuating an elevator interruption means upon detecting said earthquake vibration signal.

13. A method as defined in claim 1, comprising the further step of actuating fueling operation cutoff means upon detecting said earthquake vibration signal.

14. An electronic detector for detecting vibration signals of a stationary structure or structures positioned on a substrate and having one or more natural vibration frequencies, and determining whether said vibration signal is a P-wave signal, characterized by:

first and second sensors each having a vibration detecting transducer for detecting vibration of said stationary structure and converting said vibration into electronic signals corresponding with the frequency of said vibration;

transmission means associated with each of said sensors for transmitting said electronic signals;

filter means for selecting signals indicative of the natural vibration frequencies of the structure while permitting passage of signals indicative of P-waves;

a processing unit having receiving means for receiving and separately processing said electronic signals;

signal comparison means within said processing unit for comparing the duration and temporal overlap between said electronic signals indicative of P-waves to verify whether said signals exceed a selected amount indicative of an impending earthquake.

15. Apparatus as in claim 14 further characterized by a timer circuit within said processing unit for measuring the duration of said P-wave signals from the respective sensors.

16. Apparatus as in claim 14 further characterized by alarm means for activation when the duration of said selected signals from each of said sensors is greater than said preselected amount and there exists temporal overlap between said selected signals.

17. Apparatus as in claim 14 further characterized by potentiometer signal adjustment means for adjusting said sensors to filter one or more selected vibration signals of said structure.

18. Apparatus as in claim 14, wherein said timer circuit includes adjustment means to adjust the selected signal duration in accordance with local conditions.

19. Apparatus as in claim 14, wherein said processing unit includes a data downloading port for connection to a computer.

20. Apparatus as in claim 14 wherein said sensor and processing unit communicate by means of infrared signal transmission.

21. Apparatus as in claim 14, wherein said sensors and processing unit communicate by means of radio frequency communication.

22. Apparatus as in claim 14, wherein said sensors and processing unit communicate by means of microwave transmission means.

23. Apparatus as in claim 14, wherein said sensors and processing unit communicate by visible light transmission means.

24. Apparatus as in claim 14 wherein said sensors each include multiple laser-based light emitting diodes and said processing unit includes detectors, for transmission of said electronic signals from said sensors to said processing unit.

25. Apparatus as defined in claim 14, further characterized by amplitude selection means to filter out signals indicative of a vibration amplitude less than a selected level, and wherein said signal comparison means measure only the duration and temporal overlap of signals selected by said amplitude selection means greater than said selected level.

26. Apparatus as defined in claim 14, further characterized by third sensor means associated with said processing unit.

27. An apparatus as defined in claim 14, further comprising an audible alarm means for activation upon detection of said P-wave.

28. An apparatus a defined in claim 14, further comprising a gas supply cutoff means, actuated upon detection of said P-wave.

29. An apparatus as defined in claim 14, further comprising elevator interruption actuation means, actuable upon detection of said P-wave.

30. An apparatus as defined in claim 14, further comprising fueling operation cutoff means, actuable upon detection of said P-wave.

* * * * *